United States Patent
Takada et al.

[11] Patent Number: 5,477,179
[45] Date of Patent: Dec. 19, 1995

[54] APPARATUS FOR GENERATING A MODULATED PULSE SIGNAL

[75] Inventors: Junichi Takada, Yokohama; Tsuneo Imatani, Yokosuka; Masaki Morotomi; Akihiko Morofuji, both of Yokohama; Kosaku Tsukimi, Tokyo, all of Japan

[73] Assignee: Toyo Seikan Kaisha, Ltd., Tokyo, Japan

[21] Appl. No.: 288,495

[22] Filed: Aug. 10, 1994

Related U.S. Application Data

[62] Division of Ser. No. 966,090, Oct. 23, 1992.

[30] Foreign Application Priority Data

Nov. 1, 1991 [JP] Japan ............... 3-288085

[51] Int. Cl.$^6$ ............... H03K 5/04; H03K 5/06
[52] U.S. Cl. ............... 327/172; 377/56; 327/174; 327/270
[58] Field of Search ............... 327/172, 174, 327/261, 270; 377/56

[56] References Cited

U.S. PATENT DOCUMENTS

| | | | |
|---|---|---|---|
| 3,125,691 | 3/1964 | Astheimer | 327/174 |
| 3,217,172 | 11/1965 | Weber | 327/174 |
| 3,238,461 | 3/1966 | Merriam | 377/56 |
| 4,623,846 | 11/1986 | LaMacchia | 327/172 |
| 4,797,585 | 1/1989 | Segawa et al. | 327/172 |
| 5,199,052 | 3/1993 | Fujita | 327/261 |

*Primary Examiner*—John S. Heyman
*Attorney, Agent, or Firm*—Mark Catan; Thomas R. Morrison; Morrison Law Firm

[57] ABSTRACT

A device for printing an image onto a surface, such as food containers, employs a laser that is scanned across a surface to produce a latent image on a charged photosensitive surface formed on the surface. The surface is moved relative to the laser source while the laser is activated and deactivated according to a pattern of signal pulses from a control circuit. The device thus forms a raster image. To form very fine images, the control circuit must produce pulses with very small steps in duration. The control circuit of the present invention divides a digital value representing a duration of firing of the laser into high and low order bit sequences. The high order bits, representing a value M, are applied to a counter that generates a first pulse M clock cycles long. The low order bits and the first pulse are applied to a delay circuit. The delay circuit generates a delayed version of the first pulse, which is delayed by an amount represented by the low order bits. The first and second pulse signals are logically ORed to produce the control pulse for the laser.

10 Claims, 6 Drawing Sheets

APPARATUS FOR GENERATING A MODULATED PULSE SIGNAL

This is a divisional of co-pending application Ser. No. 07/966,090 filed on Oct. 23, 1992.

BACKGROUND OF THE INVENTION

This invention relates to a process for printing on a surface, and more particularly, to the process for printing data on a surface with high resolution by means of electrophotography.

Generally, the electrophotographic technique forms an electrostatic counterpart of an optical image on a photosensitive drum. The electrostatic latent image counterpart selectively attracts a toner material which is then transferred to a sheet of paper. The toner is heat-fused to bond it to the paper.

One popular technique for forming the electrostatic latent image employs a scanned laser beam (Light Amplification by Stimulated Emission of Radiation) for discharging portions of a charged photosensitive drum. The discharged portions correspond to those areas in which printing is not desired. The character or picture images are first stored in a memory. The elements stored in memory are then used to control the pulse of the laser as it scans the photosensitive surface.

In addition to printing on sheets of paper, it would be desirable to use such electrophotography to print on the surfaces of objects such as, for example, beer or soft drink cans, food storage containers and food storage pouches. To do this, stored image data is copied from memory to a photosensitive drum from which it is printed directly on the surface of the object. The electrophotographic method provides not only black and white printing but also color printing. For color printing, color separations of the image are printed onto the object using different color toners during separate applications. When the image is printed directly on the object in this way, the need for affixing a label to the surface of the object is eliminated.

Furthermore, since image data is stored in memory, it is easy to correct and change the image. This flexibility offers high efficiency compared to prior art printing methods.

In the prior art, printing characters with a laser printer, a resolution of from 240 to 400 dots per inch (DPI) horizontally and vertically is attainable. In computer color display applications, the apparent optical power can be improved by controlling color tones in each dot. Common computer graphics applications, together with suitable video controllers and color displays, permit display of up to 256 tones.

The same control of color tone is not available when printing on an object as when displaying color on a computer display. One of the reasons for this difference is that deposition of the tuner is not precise, even though the electrostatic latent image can be formed with enough resolution. The electrostatic latent image is produced using pulse width modulation of the laser beam to discharge each dot according to the image tone. If the diameter of the toner fraction is not exactly matched to the tone of the electrostatic latent image, multiple tone images can not be represented with sufficient accuracy.

For surface printing, it has been found that pulse width modulation of multiple tones on each dot suffers a serious drawback imposed by the speed at which the images must be exposed on the photosensitive surface. This drawback is caused by the high throughput of the product being printed. For example, in commercial operation, it is desirable to print the surfaces of drink cans at the rate of 200 cans per minute. This requires a scanning velocity of the laser beam sufficient to expose about 20 mega dots per second. It is impossible to accomplish pulse width modulation for 256 tones during the 50 nanosecond period available to form each dot.

Continuous printing is necessary to maintain production rates. The foregoing drawbacks require careful thought to improving the technique for exposure with a laser beam.

OBJECTS AND SUMMARY OF THE INVENTION

It is an object of the present invention to provide a process for printing on a surface of an object which overcomes the drawbacks of the prior art.

It is a further object of the present invention to provide a process for printing on a surface of an object, wherein it is possible to reproduce electrostatic latent images with sufficient resolution to reproduce accurate multiple tone color printed images.

Briefly stated, the present invention provides a system in which dots for producing a multiple tone electrostatic latent image are formed by selectively discharging a charged surface with a scanned laser beam. The multiple tones are produced by pulse width modulation of the laser beam according to the tones required in the dots. High resolution is maintained by limiting the diameter of toner particles to values from 1/5 to 5 times the minimum exposed dot dimension. A laser beam exposure device includes a galvanometer mirror from which the scanning laser beam is reflected. The galvanometer mirror is tilted in synchronism with the conveying direction of the surface being scanned in order to maintain focus of the laser beam on the surface. In one embodiment, the pulse width for the laser beam is produced by a combination of a digital counter and a delay circuit. The counter counts clock pulses until a first specified value is reached. A counter output pulse is generated during this counting. The delay circuit extends the counter output pulse to yield the final output pulse width. A developing system applies a positive voltage to a surface of a first conductor over which an object containing the electrostatic latent image is moved. A toner suspension is applied to the surface during this time. The object on which the image is being developed and a second conductor, adjacent a second surface of the first conductor, are given ground potential.

According to an embodiment of the invention, there is provided apparatus for printing on a surface of an object comprising: means for charging a photosensitive layer on a surface of the object, means for forming an electrostatic latent image on the photosensitive layer, the electrostatic latent image being a plurality of dots in the photosensitive layer, the dots having a minimum exposed dot dimension, means for applying a toner on the electrostatic latent image to produce a toner image, the toner being made up of particles, the particles having a particle diameter from 1/5 to 5 times the minimum exposed dot dimension, and means for heat fixing the toner image.

According to a feature of the invention, there is provided apparatus for generating a modulated pulse signal, comprising: means for receiving an n-bit digital signal representing a pulse width of the pulse signal, a counter, means for applying n-m bits of the n-bit digital signal to the counter, the n-m bits being the n-m high-order bits in the n-bit digital signal, means in the counter for counting a clock signal to produce a count, the counter being of a type producing a counter output pulse from a time of a start signal until the count equals the n-m bits, a delay circuit, means for applying m bits of the n-bit digital signal to the delay circuit, the m bits being the m low-order bits in the n-bit digital signal, the delay circuit receiving the counter output pulse, and being of a type effective for producing a delay output pulse in response thereto, the delay circuit being effective for continuing the delay output pulse past an end of the counter output pulse for a time proportional to the m bits, and logic means for producing a modulated pulse signal during the occurrence of either one of the counter output pulse and the delay output pulse, whereby the counter output pulse is extended by an amount determined by the delay output pulse.

According to a further feature of the invention, there is provided apparatus for exposing an image on a cylindrical object, comprising: means for charging a uniform electrostatic charge on a surface of the cylindrical object, means for moving the cylindrical object along a conveying path, means for rotating the cylindrical object as it moves along the conveying path, a laser source, means for modulating a density of the laser source, means for scanning a beam of the laser source along a standard position longitudinal on the cylindrical object, the means for scanning including a mirror, and means for tilting the mirror in synchronism with motion of the cylindrical object as it moves and rotates along the conveying path to maintain a focus of the beam on the standard position.

According to a still further feature of the invention, there is provided means for developing an electrophotographic image, on an object whose surface contains an electrostatic latent image thereon, comprising: a development chamber, the development chamber containing a toner consisting of toner particles suspended in a liquid medium, means for moving the surface with respect to the development chamber, a first conductor having a first side contacting the surface as the surface moves past the first conductor, means for applying the toner to the surface, means for applying a first voltage to the first conductor, a second conductor adjacent a second side of the first conductor, and means for applying a second voltage to the second conductor, whereby development of the image is enhanced.

According to a still further feature of the invention, there is provided a method for printing on a surface of an object comprising: charging a photosensitive layer on the surface of the object, forming an electrostatic latent image consisting of a plurality of dots on the photosensitive layer, the dots having a minimum exposed dot dimension, applying particles of a toner on the electrostatic latent image to produce a toner image, the particles having a particle diameter from ⅕ to 5 times the minimum exposed dot dimension, and heat fixing the toner image.

According to a still further object of the invention, there is provided a method for exposing an image on a cylindrical object, comprising: charging a uniform electrostatic charge on a surface of the cylindrical object, moving the cylindrical object along a conveying path, rotating the cylindrical object as it moves along the conveying path, modulating a density of a laser source, scanning a beam of the laser source along a standard position longitudinal on the cylindrical object, the scanning including reflecting the beam from a mirror, and tilting the mirror in synchronism with motion of the cylindrical object as it moves and rotates along the conveying path to maintain a focus of the beam on the standard position.

According to another embodiment of the invention, there is provided a method for developing an electrophotographic image on an object whose surface contains an electrostatic latent image thereon, comprising: disposing a toner consisting of toner particles suspended in a liquid medium in a development chamber, moving the surface with respect to the development chamber, contacting a first side of a first conductor with the surface as the surface moves past the first conductor, applying the toner to the surface, applying a first voltage to the first conductor, disposing a second conductor adjacent a second side of the first conductor, and applying a second voltage to the second conductor, whereby development of the image is enhanced.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
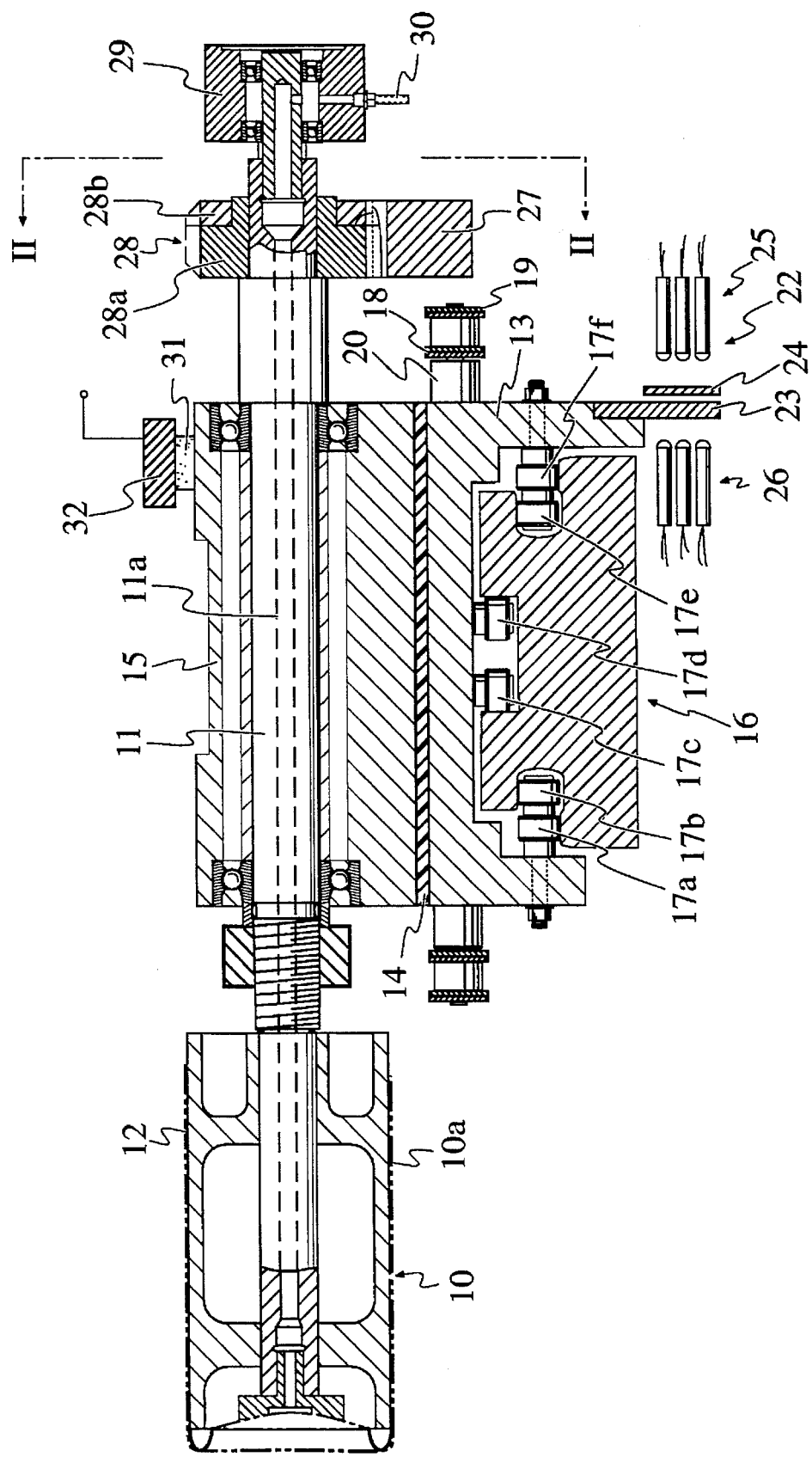
FIG. 1 is a cross section of a supporter used in performing the process of printing on a surface of a metal can according to an embodiment of the present invention.
Figure 2:
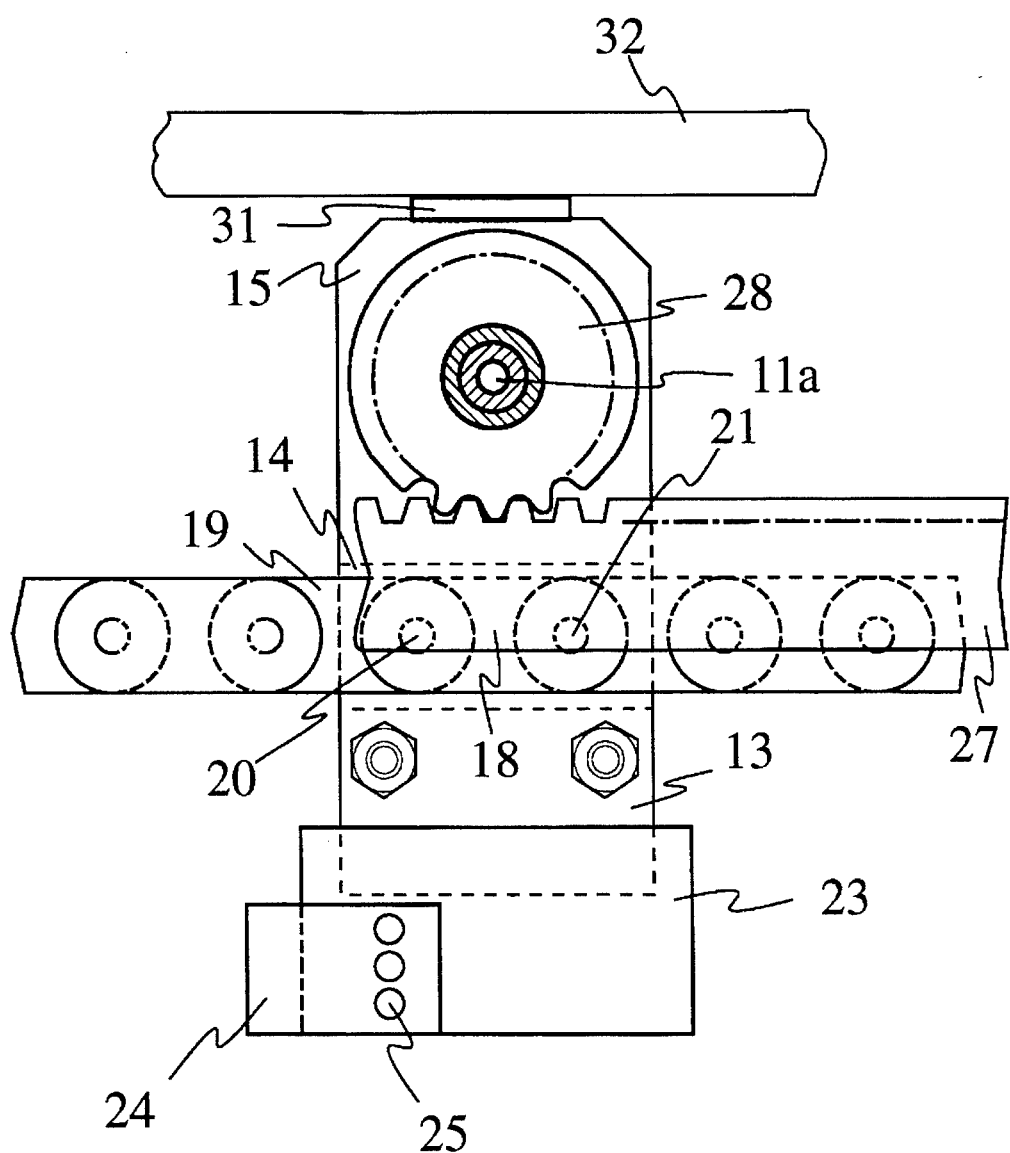
FIG. 2 is a cross section taken along II—II in FIG. 1.
Figure 3:
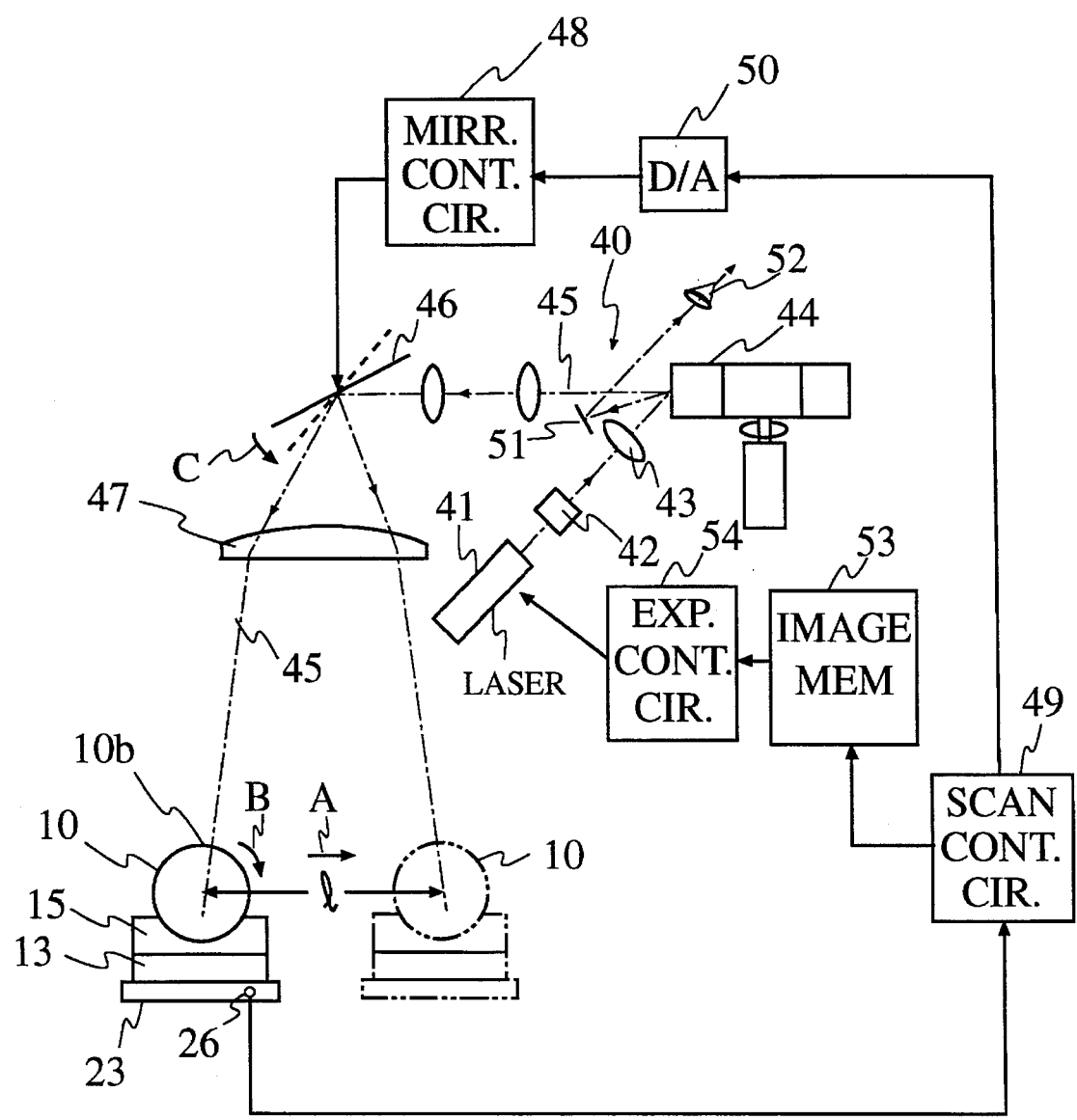
FIG. 3 is a schematic diagram of an exposure device according to an embodiment of the present invention.

Referring to FIGS. 1–3, a metal can 10 to be printed is fitted on a supporter 12 at one end of a rotating shaft 11. Supporter 12 has a size that fits the inside of metal can 10. Metal can 10 is drawn or fabricated metal such as, for example, tin-plated steel or aluminum. The inner surface of metal can 10 is free of insulating coating so that electrical contact is made between the inner surface and the outer surface of supporter 12.

A photosensitive layer 10a is coated on the outside of metal can 10, at least to cover areas on which printing is desired.

Metal can 10 is rotated on rotating shaft 11 as metal can 10 is scanned by a laser beam (not shown) in the longitudinal direction. The rotation of metal can 10 accomplishes scanning in the circumferential direction.

Rotating shaft 11 has an axial opening 11a passing therethrough and joining a similar opening in supporter 12. A vacuum is applied through a flexible tube 30 through a rotary joint 29 at one end of opening 11a. The resulting vacuum in metal can 10 holds metal can 10 rigidly affixed to supporter 12.

An electrical conductive bar 32 supports an electrical conductive brush 31 in contact with a shaft block 15. Electrical continuity is obtained between electrical conductive bar 32 and metal can 10, whereby suitable voltages can be applied from electrical conductive bar 32 to metal can 10 for printing by electrophotography.

Rotating shaft 11 is one of a plurality of similar rotating shafts each supported by a slide block 13 to move a plurality of metal cans 10 through the apparatus continuously. Rotating shaft 11 is attached rotatably to shaft block 15. Shaft block 15 is affixed to an electric insulating board 14 which is, in turn, mounted on slide block 13.

Slide block 13 is in the shape of a saddle encircling an upper portion of a guide rail 16. Six rollers 17a to 17f extend inward from slide block 13 to engage guide rail 16, thereby providing smooth guidance of slide block 13 along guide rail 16.

Referring now also to FIG. 2, two shafts 20, 21 attach slide block 13 to roller chain 18. Leaves 19 of roller chain 18 connect adjacent slide blocks 13. Roller chain 18 is driven continuously by a motor (not shown) to pass a continuous stream of metal cans through the apparatus.

A linear scale 23 is fixed parallel to guide rail 16 suspended below each slide block 13. Linear scale 23 is part of an optical linear encoder 22 for detecting exactly the position of each metal can 10 as it passes through the apparatus. In the present application, it is preferable to be able to detect the position of metal can 10 with a resolution of less than 1 µm. In addition to linear scale 23, optical linear encoder 22 includes a fixed index scale 24 disposed parallel to the path taken by linear scale 23. Three LEDs 25 face one side of index scale 24, and three photo transistors 26 face one side of linear scale 23. Each LED 25 is aligned with a phototransistor 26. Linear scale 23 and index scale 24 are transparent scales with opaque parallel scale lines thereon. As the scale lines on linear scale 23 pass the scale lines on index scale 24, the optical signals received by each photo transistor 26 vary sinusoidally. The three LEDs 25 and their respective photo transistors 26 are offset in the direction of motion of linear scale 23 to enable sine-cosine detection for improving the accuracy of position detection. Optical encoder 22 may be used to detect an amount of movement, an absolute position of movement or a standard position of slide block 13.

A rack 27 is affixed parallel to guide rail 16. A pinion 28 is disposed on rotating shaft 11. Pinion 28 meshes with rack 27 whereby, during transport of slide block 13, shaft 11, together with supporter 12 and metal can 10, are rotated in synchronism with the linear movement. Pinion 28 is a two-part device consisting of a main pinion 28a and a small pinion 28b. Main pinion 28a is rigidly affixed to rotating shaft 11. Small pinion 28b is free to rotate with respect to main pinion 28a. Both main pinion 28a and small pinion 28b engage rack 27. A spring (not shown) biases small pinion 28b in a rotational direction with respect to main pinion 28a, thereby eliminating backlash in the connection of rotating shaft 11 to rack 27.

The diameter of pinion 28 is preferably less than, but more than one third of, the diameter of metal can 10.

Referring to FIG. 3, metal can 10 completes one revolution in the direction B during a linear travel distance l in the direction A from a starting position shown in solid line to a final position shown in dashed line. In order to make the overall apparatus as compact as possible, and to minimize degradation in printing quality due to the position shift in the focus image of the laser beam, the linear travel distance l should be as small as possible. The linear travel distance l for one revolution of metal can 10 is related to the diameter of pinion 28. This relationship makes it desirable to keep the diameter of pinion 28 as small as possible.

A laser beam exposure device 40 includes a semiconductor laser oscillator 41, a collimator lens 42 and a focus lens 43. The laser beam is reflected from a polygon mirror 44. Polygon mirror 44 is rotated by its motor (not numbered) at a high rotation rate of, for example, 20,000 to 50,000 rpm to scan a scanning beam 45 in the longitudinal direction on the surface of metal can 10. Laser scanning beam 45 is reflected from a galvanometer mirror 46 which is tilted slowly to maintain the line being scanned on a standard position 10b on metal can 10 as it moves in the direction A. In this way laser scanning beam 45 is scanned rapidly along the longitudinal direction on the surface of metal can 10 in synchronism with the motion of metal can 10, thereby forming an electrostatic latent image on the surface of metal can 10. The scanning beam from galvanometer mirror 46 is refracted in a cylindrical lens 47 to maintain a generally parallel beam and to maintain its focus on standard position 10b on metal can 10.

The tilt of galvanometer mirror 46 is controlled by a mirror control circuit 48. The movement of slide block 13 is detected by a photo transistor 26 of linear encoder 22. A scanning control circuit 49 employs the signal from photo transistor 26 to determine the position of metal can 10. An output of scanning control circuit 49 is applied to mirror control circuit 48 through a digital to analog (D/A) converter 50. The output of mirror control circuit 48, applied to galvanometer mirror 46, controls the tilt of galvanometer mirror 46 synchronously with the progress of metal can 10.

A horizontal sync mirror 51 reflects a portion of scanning beam 45 to a photodetector 52 which produces a horizontal sync pulse signal used by mirror control circuit 48 to provide exact control of each scanning position.

Semiconductor laser oscillator 41 emits a pulse width modulated beam to establish the density of each dot. The laser beam selectively discharges portions of the previously charged surface of the photosensitive layer on metal can 10 to form an electrostatic latent image. This exposure beam pulse width determines the density of each dot. In this embodiment, the electrostatic latent image is formed directly on the surface of metal can 10 with a density of 400 DPI (dots per inch), and with sufficient control over the exposure beam pulse width to provide control of 256 tone levels (8 bits). The image to be printed is stored in an image memory 53. The pulse width of the output of laser oscillator 41 is controlled by an exposure control circuit 54.

Preferably, metal can 10, which has a photosensitive layer 10a such as, for example, oxide-titanium on its body is affixed to supporter 12 by a vacuum applied while it is moved horizontally in the direction of arrow A at a speed of 30 meters per minute. The engagement of pinion 28 with rack 27 rotates metal can 10 in the direction of arrow B at a rate determined by the translation speed and the diameter of pinion 28.

Metal can 10 passes through a charging device, which will be described later, where the photosensitive layer thereon is charged with, for example, a generally uniform negative electrical potential. The longitudinal position of the axis of metal can 10 is monitored by linear encoder 22. Scanning beam 45 is scanned rapidly in a longitudinal direction by the rapid revolution of polygon mirror 44. Scanning in the circumferential direction is performed more slowly by the rotation of metal can 10 about its axis. Galvanometer mirror 46 maintains the line of longitudinal scanning on standard position 10b during the time it takes for metal can 10 to execute the required rotation in the direction B about its axis to complete the exposure of the image on photosensitive layer 10a. An exposure control circuit 54 modulates the laser beam pulse width in response to image density for a particular dot. This permits control of 256 color tones. After metal can 10 is exposed by scanning beam 45, galvanometer mirror 46 is rotated back to its starting position to prepare for the next can.

Photosensitive layer 10a is connected to electrical conductive bar 32 through metal can 10, supporter 12, rotating shaft 11, shaft supporting block 15 and electrical conductive brush 31. During exposure, electrical conductive bar 32 is connected to a ground to permit charges liberated from metal can 10, by impingement of scanning beam 45, to flow to ground.

Pulse width modulation, as used, for example, in data communications, is generated by comparing a direct current, related to the image density, with triangle wave output to decide the turn-on and turn-off times for generating the output pulse. This is called analog pulse width modulation. Normal analog pulse width modulation is not suitable for surface printing at high throughput because of the high frequency triangle wave oscillator necessary to control 256 tone levels for each dot. Also, analog pulse width modulation is subject to error from external electrical noise.

The present invention avoids this drawback by using an all-digital pulse width modulation circuit. This resists the influence of external noise. In addition, the present invention substantially reduces the requirements on its oscillator frequency for controlling a multiple tone input signal.

Figure 4:
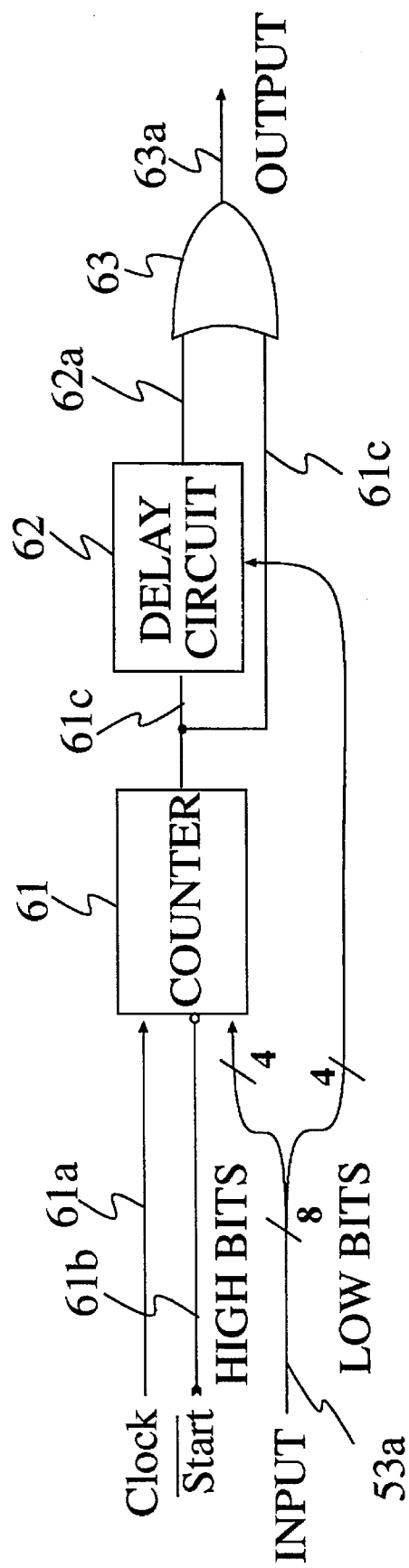
FIG. 4 is a logic diagram showing a pulse width modulation exposure control circuit used in the embodiment of the present invention.
Figure 5:
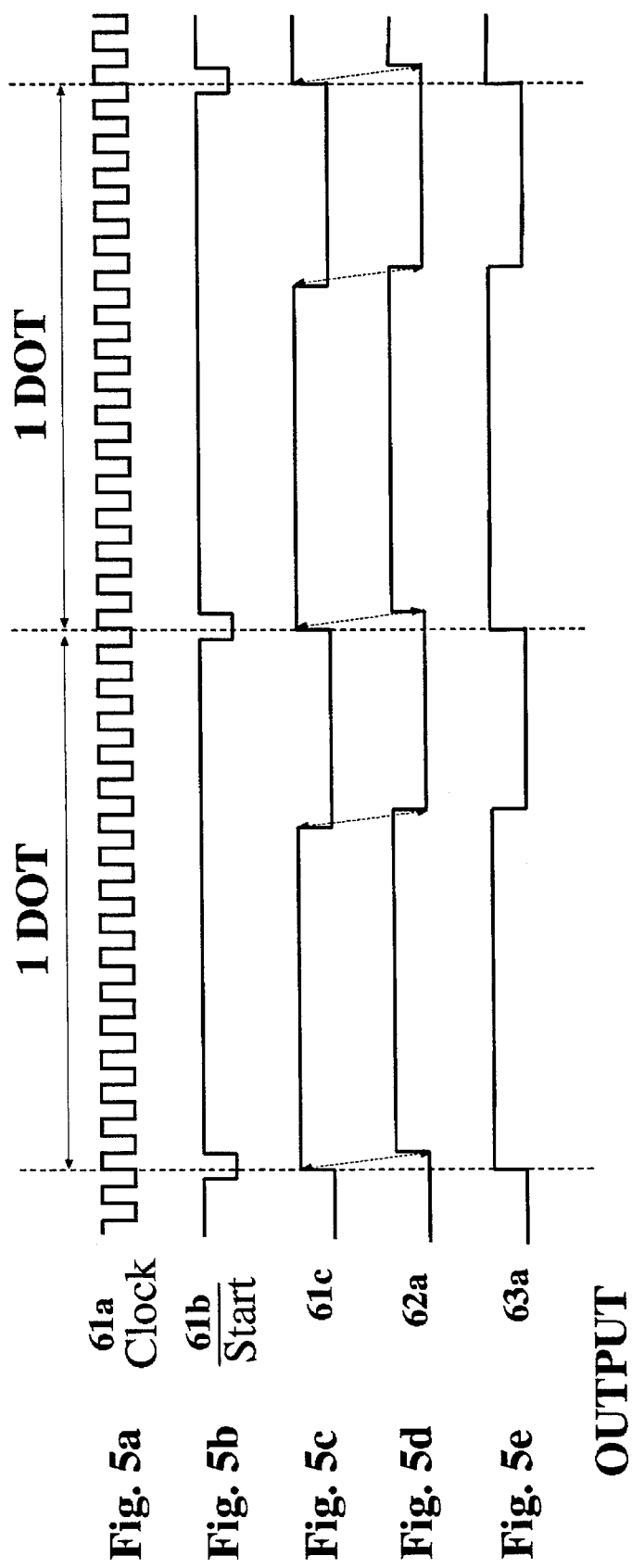
FIGS. 5a–5e are wave forms to which reference will be made in describing the circuit in FIG. 4.

Referring now to FIG. 4, exposure control circuit 54 receives an 8-bit input signal 53a, read from an image memory 53. The high 4 bits of input signal 53a are fed to a counter 61. The low 4 bits of input signal 53a are fed to a delay circuit 62. Counter 61 receives a clock signal 61a at a high enough frequency to control 16 tone levels using 4 bits at 400 DPI. Counter 61 begins to count up or down upon receiving a start signal 61b. Counter 61 compares the count it contains at any time with the value of the high 4 bits of the density input signal 53a.

Referring to FIGS. 5a–5e, waveforms at various points in the exposure control circuit of FIG. 4 are shown. Beginning with the occurrence of start signal 61b, counter 61 outputs a high on signal counter output 61c while it compares its count of clock signal 61a with the high 4 bits of input signal 53a. When the content of counter 61 equals the high 4 bits of input signal 53a, the counter output 61c becomes low. Thus, the pulse width of counter output 61c corresponds to high 4 bits of input signal 53a.

The low 4 bits of input signal 53a, fed to delay circuit 62, sets the delay period of delay circuit 62. The minimum delay period is set, for example, at one sixteenth of 1 cycle of clock signal 61a. The output pulse width of counter output 61c is extended by delay output 62a from delay circuit 62 in an OR gate 63 to produce final output signal 63a which is used to control the pulse width modulation of semiconductor laser oscillator 41.

In effect, the pulse width produced by counter 61 in response to the high 4 bits is extended or stretched by the delay imposed by delay circuit 62 to produce final output signal 63a. Since the delay imposed by delay circuit 62 has a minimum value that varies in steps from one-sixteenth of one cycle of clock signal 61a to one clock cycle, very sensitive control of pulse width modulation is provided. The final result is control of the pulse width of the output of semiconductor laser 41 sufficient to control the tone of each dot such that 256 tones can be reproduced.

Normally, to control a counter sensitively enough to modulate 256 color tones, the counter must be capable of counting 8 bits. This requires a clock frequency which is 16 times as high as clock signal 61a. In the present invention, the clock frequency is decreased by a factor of 16, because of the delay controlled by the low 4 bits of input signal 53a. This reduces the frequency requirements on the clock oscillator in exposure control circuit 54. Since the entire laser beam exposure device 40 is digital, the influence of external electrical noise is reduced or eliminated.

Figure 6:
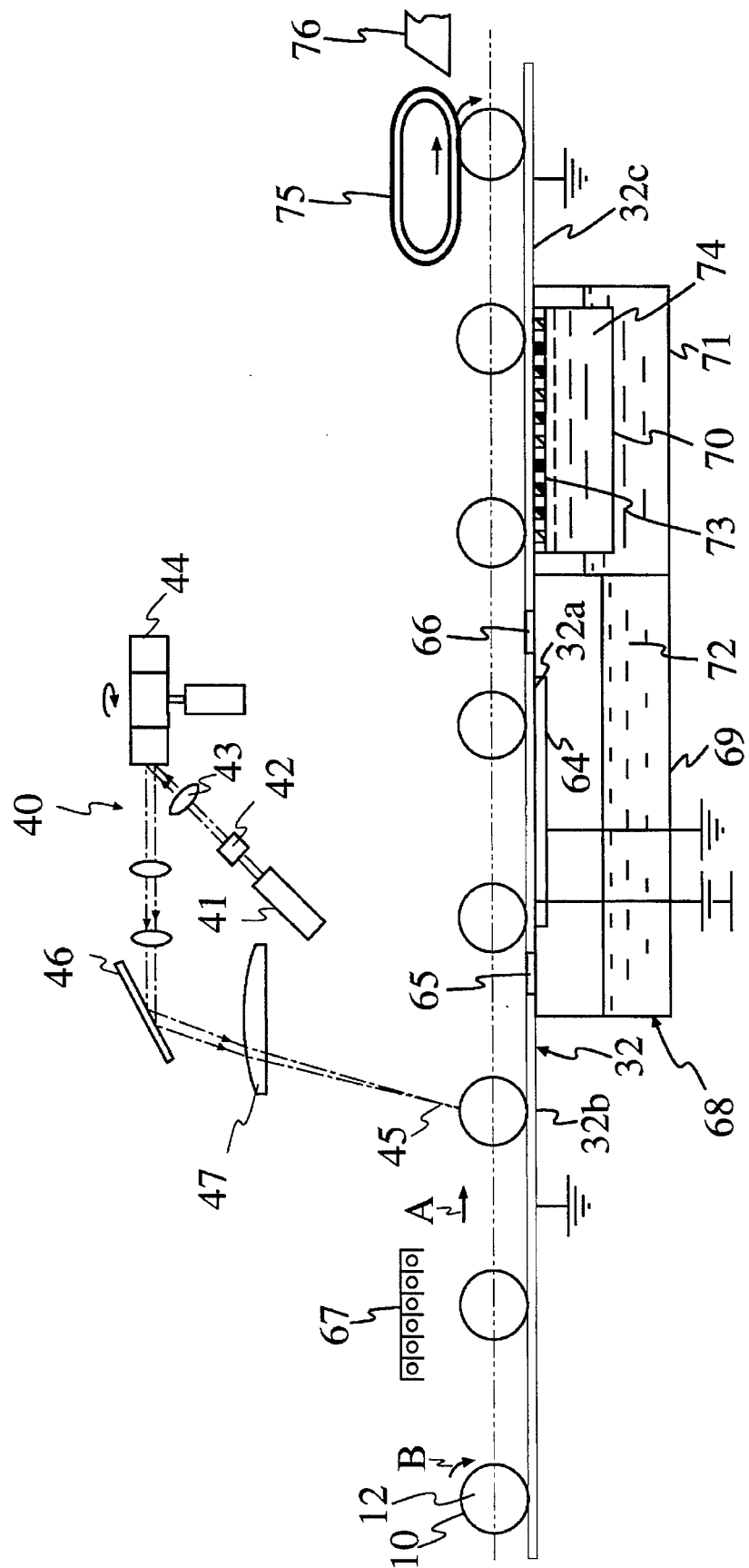
FIG. 6 is a schematic diagram showing a printing process employing an embodiment of the present invention.

Referring to FIG. 6, a portion 32a along a developing electrode 64 of electric conductive bar 32 is insulated by electrical insulating portions 65 and 66 from portions 32b and 32c of electric conductive bar 32. Portion 32a is biased at +70 V. Portions 32b and 32c are at ground potential. On contact with portion 32b, the surface of metal can 10 is connected electrically to ground.

In portion 32b, an electric charging device 67, for example, a scorotron, deposits electrons on the surface of metal can 10 to give this surface a negative electrostatic charge of about −300 volts. A scorotron is a charging device which includes an emitter that is maintained at a high negative voltage and a grid that is maintained at an intermediate negative voltage. Electrons emitted by the emitter are accelerated past the more positive emitter toward grounded metal can 10. Since a ground potential is more positive than the intermediate negative voltage on the grid, the electrons are further accelerated between the grid and the surface of metal can 10. Because of the acceleration and control of electrons, a scorotron device decreases the drift of charges deposited on the photosensitive layer of metal can 10.

In the present invention, toner is deposited optimally in the developing device according to exposure width. To achieve this object, the diameters of toner particles are limited to a range of 1/5 to 5 times the minimum exposed dot dimension. As a consequence, it is possible to develop and print the exposed image without loss of resolution due to the exposure.

To produce 256 tones at 400 DPI, an exposure width between 0.248 μm minimum and 63.5 μm maximum is required.

Preferably, the average toner particle diameter is set to equal the minimum exposure width defined by the resolution.

The range of diameters of toner particles is limited by the difference in velocity attained by toner particles of different sizes moved in solvent by the electrophoretic effect. Smaller particles, having a higher area to mass ratio, reach terminal velocities that are lower than that reached by larger particles. If the range of particle diameters is outside the desired range, those that are too small may make no contribution to developing the image, while those that are too large may make an excessive contribution to developing the image. Either of these effects, or both, can produce unstable development.

If the minimum value of toner particle diameter exceeds 1/5 the minimum exposure value or if the maximum value of toner particle diameter is less than 5 times the minimum exposure value, satisfactory resolution is generally attainable.

A wet developing device 68 includes a developing chamber 69 containing a toner suspended in an appropriate solvent. A developing electrode 64, connected electrically to ground, is disposed below portion 32a, along the direction of movement of metal can 10. A developing solution 72 is supplied through a nozzle (not shown) onto developing electrode 64. Developing solution 72 from developing electrode 64 is recycled to developing chamber 69.

Developing solution 72 includes a petroleum hydrocarbon solvent such as, for example, ISOPAR (trademark of EXXON), into which is mixed the desired toner particles. Toner particles for color printing contain pigments such as the following: benzinc yellow and micro crystalline yellow for yellow; quinacridone, rhodamine or carmine for magenta; phthalocyanine blue, oil blue, alkali blue or ultra blue for cyan; and carbon black for black. The particle sizes for these toners are between ⅕ and 5 the size of the minimum exposure width. For example, with a minimum exposure width of 0.248 μm for producing 256 tones at 400 DPI, the toner particle diameters are preferably between about 0.05 μm and 1.2 μm. Since the particle diameters of most toners exceed 10 μm, such toners require further processing to reduce their particle diameters to the above values.

A washing chamber 71, downstream of developing chamber 69, contains a washing liquid chamber 70. Washing liquid chamber 70 has a top board 73 having many small holes therein. A cleaning liquid 74, pumped from washing liquid chamber 70 through the small holes in top board 73, removes any residue of developing solution 72 on the surface of metal can 10. In the preferred embodiment, cleaning liquid 74 is a petroleum hydrocarbon solvent. A sponge belt 75, downstream of washing chamber 71, contacts a surface of metal can 10 to remove any cleaning liquid 74 remaining on metal can 10. The toner pattern on metal can 10 is then fixed by heat from a heat source such as, for example, a radiant heater 76.

When metal can 10 passes through electric charging device 67, its photosensitive layer is electrostatically charged to −300 V. Next, it is scanned by scanning beam 45 in exposure device 40 to form a negative electrostatic latent image in which the parts of photosensitive layer which receive light from the laser do not attract toner, and thus they become the non-image parts. During exposure, the charge on exposed locations flow to ground through electrical conductive bar 32. Exposure varies the voltage of exposed parts as much as about −50 V (−EV).

In developing device 68, developing electrode 64 is connected to ground and portion 32a of electric conductive bar 32 is biased between −50 V and −100 V. This bias voltage enhances development of the electrostatic latent image. The prior art contains no counterpart of this bias.

Cylindrical metal can 10 faces developing electrode 64 for too short a period to complete all aspects of development. In particular, even though not firmly adhered to the photosensitive layer, toner remains on the non-image part of metal can 10 after it leaves wet developing device 68. This is called fog. To overcome fog, a wring roller, air knife, vacuum absorber or the like (none of which are shown) are used downstream of wet developing device 68 to remove developing liquid 72, together with the unadhered toner particles.

For color printing, a sequence of devices, corresponding to those described above, are arranged in series with a different color being applied in each device. For three-color printing, yellow, magenta and cyan are applied in a three-step process. For four-color printing, the color black is added in a fourth process step.

According to the above, the present invention provides a process for printing a surface using a combination of exposure with pulse width modulation and a developing process where the diameter of the toner particles is controlled to a defined relationship with the minimum resolution, whereby each dot can contribute multiple tones in an image.

Besides its use in printing a cylindrical metal object such as a metal can, the present invention can be applied to printing on a planar metal board.

According to the invention, it is not necessary to print directly on an object. Instead, an electrostatic latent image may be formed on a photosensitive drum from which it can be copied to an object to receive printing such as, for example, a retort pouch.

Furthermore, the present invention can be used in a dry developing process using the restriction of the range of diameters of toner particles as defined above.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. Apparatus for generating a modulated pulse signal, comprising:

means for receiving an n-bit digital signal representing a pulse width of said pulse signal;

said n-bit digital signal having n-m high order bits and m low order bits;

said n-m high order bits representing a high order value;

said m low order bits representing a low order value;

a counter;

means for applying said n-m high order bits of said n-bit digital signal to said counter;

said counter including means for counting a clock signal to produce a count;

means for producing a start signal;

said counter further including means for producing a counter output pulse from a time of said start signal until said count equals said high order value;

a delay circuit;

means for applying said m low order bits to said delay circuit;

said delay circuit having means for receiving said counter output pulse and for producing a delay output pulse in response thereto;

said delay circuit being effective for continuing said delay output pulse past an end of said counter output pulse for a time proportional to said low value; and logic means for producing said modulated pulse signal during the occurrence of either one of said counter output pulse and said delay output pulse, whereby said counter output pulse is extended by an amount determined by said delay output pulse.

2. Apparatus according to claim 1, wherein said logic means includes an OR gate.

3. Apparatus for generating a modulated pulse signal of a duration represented by an n-bit digital value, comprising:

said digital value having n-m high order bits representing a high value and m low order bits representing a low value;

means for generating a first pulse whose duration is a function of said high value;

means for generating a second pulse whose duration is equal to said duration of said first pulse;

said second pulse occurring a interval after said first pulse;

said interval being a function of said low order value; and means for generating a logical OR of said first pulse and said second pulse.

4. Apparatus as in claim 3, wherein said means for generating a first pulse includes:

a counter;

means for applying said n-m bits to said counter;

a clock for producing a clock signal;

means in said counter for counting said clock signal to produce a count;

an output of said means for generating a first pulse;

said output being at a first level; and means for holding said output at a second level from a start time until said count equals said high value.

5. Apparatus as in claim 4, wherein said means for producing a second pulse includes:

a delay circuit having an input and a delayed output;

said delayed output being at a third level;

means for applying said m bits to said delay circuit;

means for applying said first pulse to said input; and said delay circuit including means for generating, at said delayed output, a signal proportional to said first pulse, and temporally shifted by said interval with respect to said first pulse.

6. Apparatus as in claim 3, wherein said means for producing a second pulse includes:

a delay circuit having an input and a delayed output;

said delayed output being at a third level;

means for applying said m bits to said delay circuit;

means for applying said first pulse to said input; and said delay circuit including means for generating, at said delayed output, a signal proportional to said first pulse and temporally shifted with respect to said first pulse by said interval.

7. Apparatus for generating a modulated pulse signal of a duration represented by a value signal representing a value, comprising:

means for dividing said value signal into high and low sub-value signals which respectively represent high and low values;

a sum of said high and low values being equal to said value; means for generating a first pulse whose duration is a function of said high value;

means for generating, an interval after said first pulse, a second pulse whose duration is equal to the duration of said first pulse;

said interval being a function of said low order value; and means for generating a logical OR of said first pulse and said second pulse.

8. Apparatus as in claim 7, wherein said means for generating a first pulse includes:

a counter;

means for applying said high sub-value signal to said counter;

a clock for producing a clock signal;

means in said counter for counting said clock signal to produce a count;

an output of said means for generating a first pulse;

said output being at a first level; and means for holding said output at a second level from a start time until said count equals said high value.

9. Apparatus as in claim 8, wherein said means for generating a second pulse includes:

a delay circuit having an input and a delayed output;

said delayed output being at a third level;

means for applying said low sub-value signal to said delay circuit;

means for applying said first pulse to said input; and said delay circuit including means for generating, at said delayed output, a signal proportional to said first pulse and temporally shifted by said interval with respect to said first pulse.

10. Apparatus as in claim 7, wherein said means for producing a second pulse includes:

a delay circuit having an input and a delayed output;

said delayed output being at a third level;

means for applying said low sub-value to said delay circuit;

means for applying said first pulse to said input; and said delay circuit including means for generating, at said delayed output, a signal proportional to said first pulse and temporally shifted with respect to said first pulse by said interval.

* * * * *